United States Patent
Okaue et al.

(10) Patent No.: US 6,775,754 B2
(45) Date of Patent: Aug. 10, 2004

(54) MEMORY APPARATUS AND MEMORY ACCESS RESTRICTING METHOD

(75) Inventors: Takumi Okaue, Kanagawa (JP); Yasuko Miura, Tokyo (JP)

(73) Assignee: Sony Corporation (JP)

( * ) Notice: Subject to any disclaimer, the term of this patent is extended or adjusted under 35 U.S.C. 154(b) by 317 days.

(21) Appl. No.: 09/967,410

(22) Filed: Sep. 28, 2001

(65) Prior Publication Data

US 2002/0040423 A1 Apr. 4, 2002

(30) Foreign Application Priority Data

Sep. 29, 2000 (JP) ..................................... P2000-300974

(51) Int. Cl.⁷ ............................................. G06F 12/00
(52) U.S. Cl. ..................................... 711/163; 711/152
(58) Field of Search ............................... 711/102, 103, 711/152, 154, 163, 164; 705/57; 369/53.21

(56) References Cited

U.S. PATENT DOCUMENTS

| | | | | |
|---|---|---|---|---|
| 4,819,204 A | * | 4/1989 | Schrenk ...................... | 711/164 |
| 6,032,237 A | * | 2/2000 | Inoue et al. ................. | 711/163 |
| 6,101,586 A | * | 8/2000 | Ishimoto et al. ............ | 711/163 |
| 6,243,796 B1 | * | 6/2001 | Otsuka ........................ | 711/163 |
| 6,618,789 B1 | * | 9/2003 | Okaue et al. ................ | 711/103 |

* cited by examiner

*Primary Examiner*—Pierre M Vital
(74) *Attorney, Agent, or Firm*—Lerner, David, Littenberg, Krumholz & Mentlik, LLP

(57) ABSTRACT

When the power of a memory apparatus is turned on, data written to a designated area of a memory of the memory apparatus is loaded to a register. When an initial state detecting portion has detected that data loaded to the register is an initial value, a gate G0 is turned on. As a result, a designated area and a hidden area become accessible. When data that is different from the initial value is written to the designated area, the designated area and the hidden area are access-restricted. When a used state detecting circuit has detected that the used capacity of the memory matches a setup value, the gate G0 is turned on. As a result, the hidden area becomes accessible. Hidden data prewritten to the hidden area is information rewarded to the user or advertisement/commercial information.

21 Claims, 5 Drawing Sheets

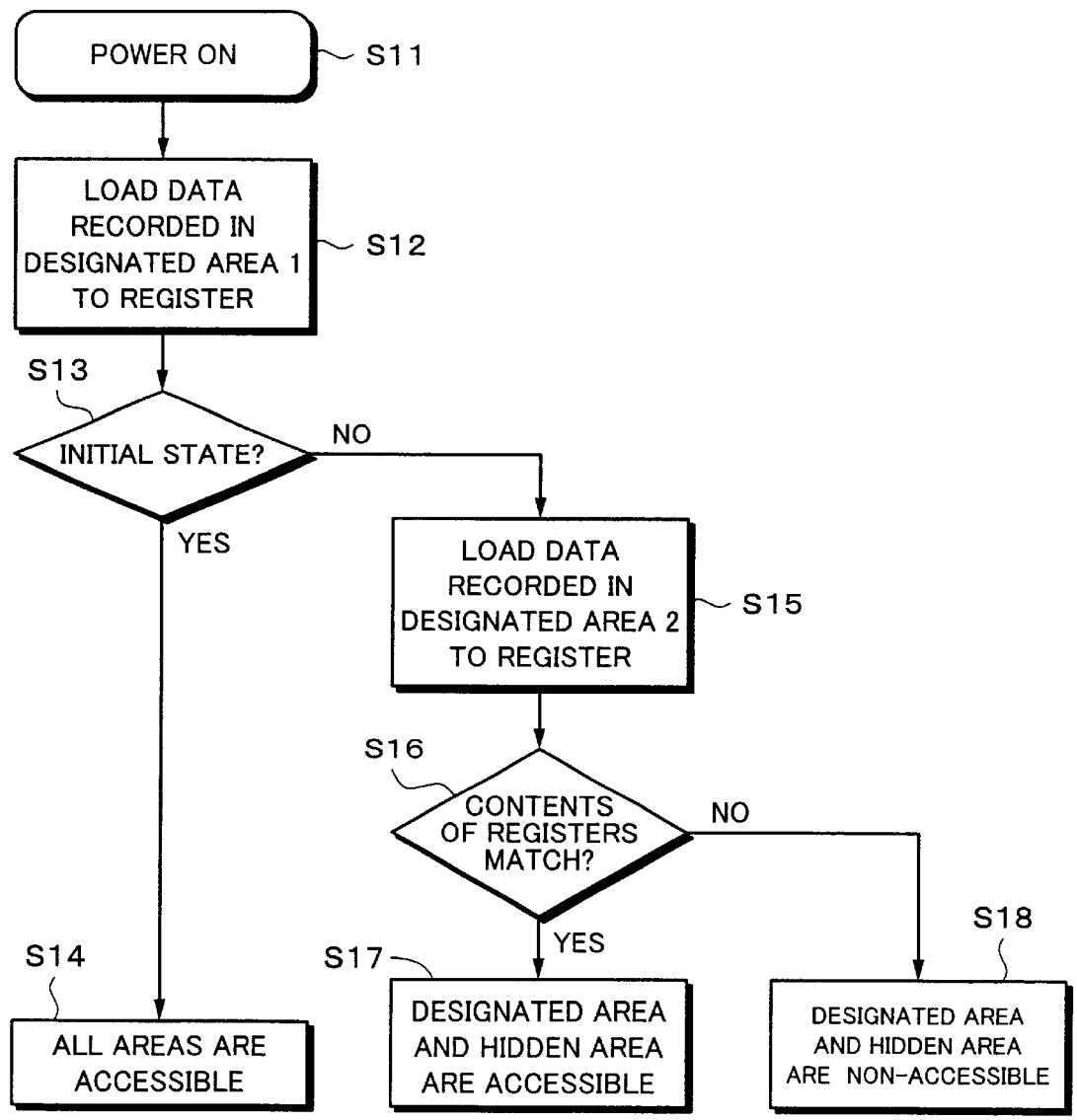

MEMORY APPARATUS AND MEMORY ACCESS RESTRICTING METHOD

BACKGROUND OF THE INVENTION

1. Field of the Invention

The present invention relates to a memory apparatus and a memory access restricting method that use a reversibly non-writable memory.

2. Description of the Related Art

A reversibly non-writable memory of which data can be written one time is known. For example, as a semiconductor memory, a so-called OTP (One Time Programmable) ROM in which data can be written one time has been proposed. The related art reference is a non-volatile reversibly non-writable memory. In other words, according to the related art reference, once data is written, it cannot be erased. Thus, even if the power of the memory is turned off, written data is retained. The reversibly non-writable memory can be fabricated at a lower cost than a flash memory.

Recently, the commercial use of card type flash memories as data record mediums tends to increase. For example, still pictures photographed by a digital camera are recorded to a flash memory. However, the cost of a flash memory is relatively high. In contrast, although the cost of a OTP is relatively low, it cannot be re-used as an adverse problem thereof. Thus, when the cost of an OTP is further decreased, it can be expected that it will be widely used. Generally, it is said that the cost of a device as a record medium is reversely proportional to the quantity placed on the market.

OBJECTS AND SUMMARY OF THE INVENTION

Therefore, an object of the present invention is to provide a memory apparatus and an access restricting method that allow a reversibly non-writable memory to be more widely used.

To solve the above-described problem, a first aspect of the present invention is a memory apparatus composed of a reversibly non-writable memory, comprising an initial data area to which initial data is pre-written, a user data area to which data prepared by the user is written, and a setup data area to which a setup state is written, wherein when data that is different from the initial data is written to said initial data area, said user area becomes non-accessible, and wherein when the used state of the memory is in the setup state, said user data area becomes accessible.

A second aspect of the present invention is a memory apparatus composed of a reversibly non-writable memory, comprising a first designated area to which initial data is pre-written, a user data area to which data prepared by the user is written, and a second designated area, wherein when predetermined data that is different from the initial data is written to said first designated area, said user data area becomes non-accessible, and wherein when data having a predetermined relation with predetermined data is written to said second designated area, said user data area becomes accessible.

A third aspect of the present invention is an access restricting method for a non-volatile reversibly non-writable memory apparatus, when predetermined data is written to a first designated area of the memory apparatus, the predetermined area being access-restricted, comprising the steps of detecting whether or not the memory apparatus has become access-restricted, causing the memory apparatus to be changed to an access restricted state when the memory apparatus has not been access-restricted, and causing the memory apparatus to be changed to an access permitted state when the memory apparatus has been access-restricted and the used state of the memory apparatus is in a predetermined state.

A fourth aspect of the present invention is an access restricting method for a non-volatile reversibly non-writable memory apparatus, when predetermined data is written to a first designated area, a predetermined area being access-restricted, comprising the steps of detecting whether or not the memory apparatus has been access-restricted, causing the memory apparatus to be changed to an access restricted state when the memory apparatus has not been access-restricted, and causing the memory apparatus to be changed to an access permitted state when the memory apparatus has been access-restricted and data written to a second designated area of the memory apparatus has a predetermined relation with the predetermined data.

According to the present invention, when a memory is used a predetermined number of times or when data that has a predetermined relation with particular data is written to a predetermined area of the memory, pre-written data can be accessed. The data may provide the user with a reward. Alternatively, the data may be advertisement/commercial information. Thus, the data will contribute to promote the promotion of the use of the memory apparatus, resulting in reducing the cost thereof.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 5 is a flow chart for explaining the operation of the memory apparatus according to the embodiment shown in FIG. 4.

DETAILED DESCRIPTION OF THE PREFERRED EMBODIMENTS

Figure 1:
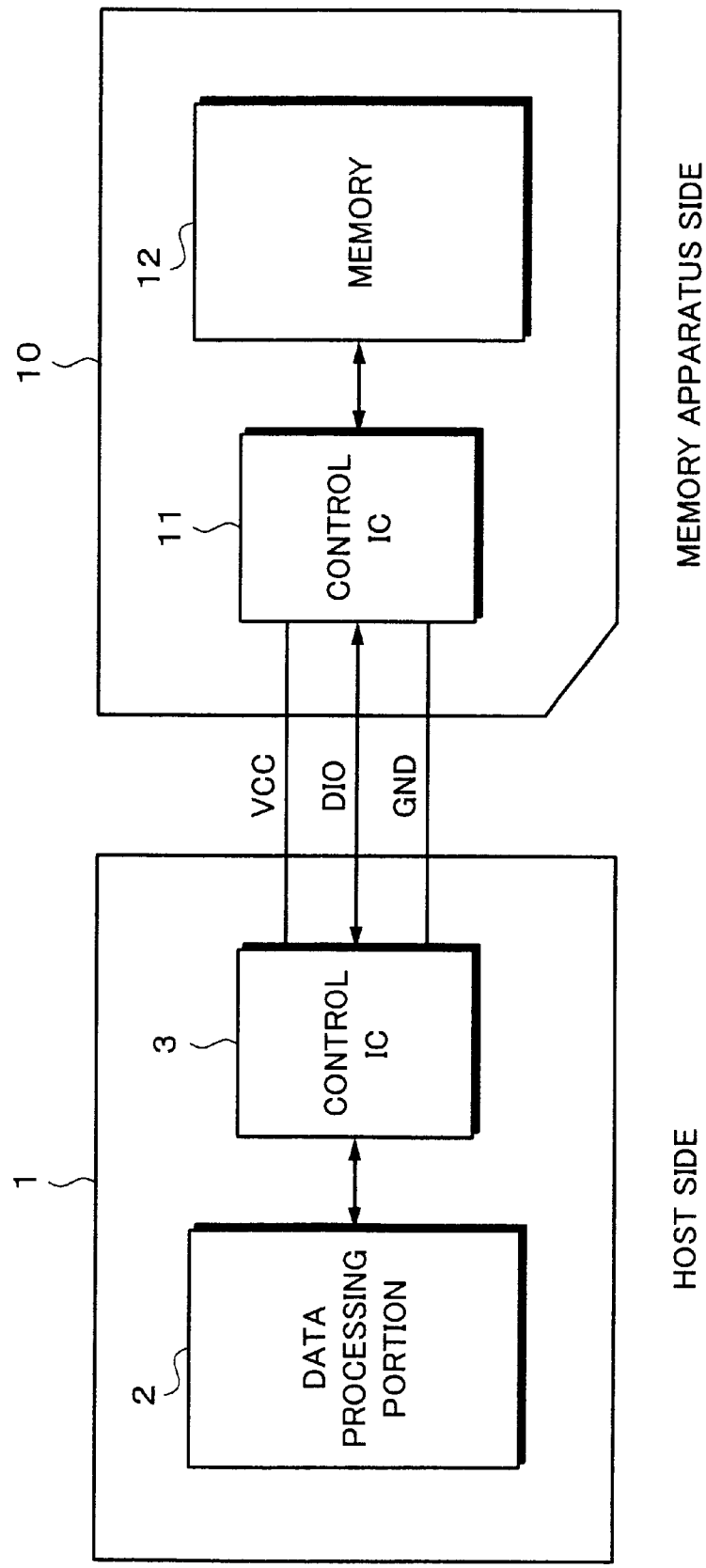
FIG. 1 is a block diagram showing an example of a system according to the present invention.

FIG. 1 shows an outline of the structure of a system according to an embodiment of the present invention. Referring to FIG. 1, a host side and a memory apparatus side are connected through a serial interface. A host side data processing device 1 has a data processing portion 2 and a control IC 3. A memory apparatus 10 has a control IC 11 and a memory 12. The memory apparatus 10 has a card-shaped structure attachable and detachable to/from the data processing device 1.

The data processing portion 2 generates data written to the memory apparatus 10. In addition, the data processing portion 2 reads data from the memory apparatus 10 and performs various data processes for data that is read from the memory apparatus 10. For example, the data processing device 1 is a digital electronic camera. A photographed picture is written to the memory apparatus 10. In addition, a picture is read from the memory apparatus 10. Another example of the data processing device 1 is an audio recording/reproducing device. Compressed audio data is written to the memory apparatus 10. In addition, compressed audio data is read from the memory apparatus 10.

Each of the control ICs 3 an 11 comprises a parallel-serial converting circuit, a buffer memory (that temporarily stores data), and an interface circuit. A power line VCC, a data line DIO, and a ground line GND are disposed between the control ICs 3 and 11. A command and write data are transferred from the data processing device 1 to the memory apparatus 10 through the data line DIO. Read data is transferred from the memory apparatus 10 to the data processing device 1 through the data line DIO. In addition, signal lines for transferring a clock signal, a control signal, and so forth are disposed (not shown).

Figure 2:
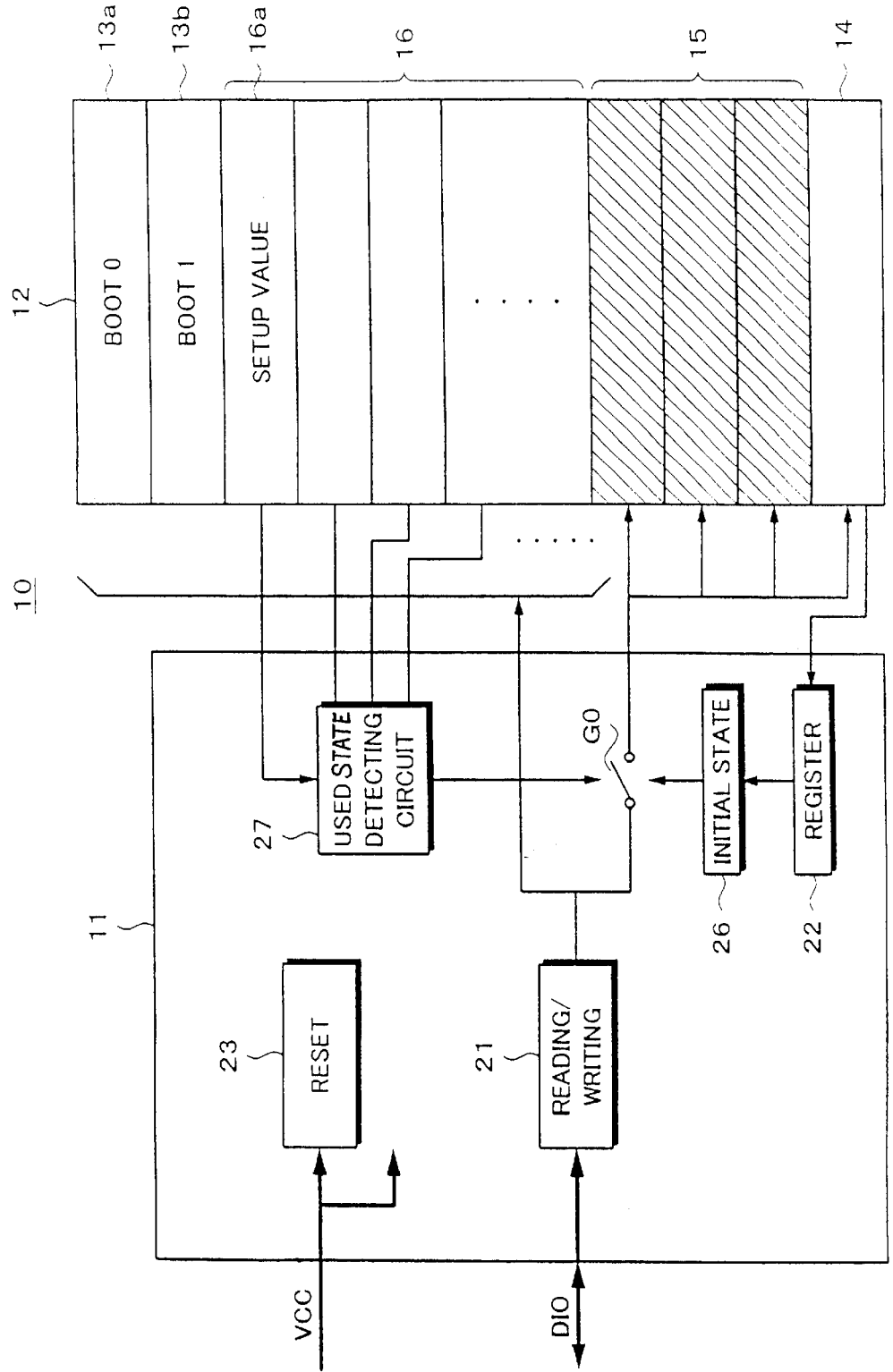
FIG. 2 is a block diagram showing the structure of a memory apparatus according to an embodiment of the present invention.

FIG. 2 shows a detail of the structure of the memory apparatus 10 according to the embodiment. Data in a predetermined unit (for example, a horizontal stripe shaped area shown in FIG. 2) is read and written from/to the memory 12. Predetermined two areas of the memory 12 are boot areas 13a and 13b. Various types of information such as attribute information are prerecorded to the boot areas 13a and 13b. For example, information that represents whether the memory apparatus is a read-only memory, an access restricted memory, or a rewritable memory is pre-recorded to the boot areas 13a and 13b. In an environment of which a plurality of memory apparatuses having different characteristics may be used, characteristics of the memory apparatuses are identified with the attribute information recorded in the boot areas 13a and 13b.

The boot areas 13a and 13b are areas that are initially read by the data processing device 1 when the memory apparatus 10 is attached thereto. The boot areas 13a and 13b are areas that are always readable. In addition, the memory 12 has a designated area 14 and a hidden area (hatched area) 15. A memory area (user area) other than the boot areas 13a and 13b, the designated area 14, and the hidden area 15 is denoted by reference numeral 16. User data is written to the user area 16.

The memory 12 that is a reversibly non-writable memory (OTP) is used from the beginning of the user area 16 (the highest area shown in FIG. 2). A setup value is written to an area 16a at the beginning of the user area 16. The setup value is a value representing the ratio of the total memory capacity and the used memory capacity of the memory 12. For example, the setup value is represented in the write data unit of the memory 12. For example, a setup value equivalent to the case that around 80% of memory capacity is used is written to the area 16a. In addition, when data is written to each area, a flag (of for example one bit) that represents that the relevant area has been used is set. The record position of each flag is written to each area of the memory.

When the memory apparatus 10 is shipped, an initial value is written to the designated area 14. On the other hand, hidden data is recorded to the hidden area 15. After the memory apparatus 10 is shipped, character data, music data, picture data, or a combination thereof as hidden data is recorded by a secondary memory provider for example a content provider or a content distributor. Beside people who sell memories as business activities, a private individual may record hidden data to the memory 12. As will be described later, hidden data is information that provides a reward to a user or advertisement/commercial information.

An access controlling portion 21 is connected to the data line DIO of the control IC 11. The access controlling portion 21 controls the writing operation and reading operation for data to/from the memory 12. The access controlling portion 21 comprises a buffer memory (that stores data) and a register (that stores a command).

In addition, a reset signal generating portion 23 is connected to the power line VCC. The reset signal generating portion 23 monitors the voltage fluctuation of the power line VCC, detects the power on state of the memory apparatus 10, and generates a reset signal corresponding to the detection of the power on state. Data written to the designated area 14 is loaded to the register 22 corresponding to the reset signal.

The access controlling portion 21 is connected to the boot areas 13a and 13b and the user area 16 of the memory 12. Thus, the boot areas 13a and 13b and the user area 16 can be always accessed. In addition, a gate (switch) G0 is disposed between the access controlling portion 21 and the designated area 14 and the hidden area 15 of the memory 12. Once the gate G0 is turned off or on with a control signal, the current state is kept retained until the control signal is supplied.

An initial state detecting portion 26 is disposed in the control IC 11. The initial state detecting portion 26 detects whether or not data that is read from the designated area 14 to the register 22 corresponding to the reset signal is in the initial state. With a detected output of the initial state detecting portion 26, the on/off state of the gate G0 is controlled.

In addition, a used state detecting circuit 27 is disposed in the control IC 11. The setup value recorded in the area 16a and a flag that represents whether or not an area other than the area 16a has been used are supplied to the used state detecting circuit 27. The used state detecting circuit 27 detects whether or not the used memory capacity matches the setup value. With a detection signal that is generated corresponding to the detected result, the on/off state of the gate G0 is controlled.

Next, the controlling operation for the gate G0 will be described. When the detected result of the initial state detecting portion 26 represents that the data that has been read from the designated area 14 to the register 22 is in the initial state, the gate G0 is turned on. When the detected result represents that the data is not in the initial state, the gate G0 is turned off. When the detected result of the used state detecting circuit 27 represents that the used memory capacity does not match the setup value, the gate G0 is turned off. When the detected result of the used state detecting circuit 27 represents that the used memory capacity matches the setup value, the gate G0 is turned on. When the gate G0 is turned on, both the designated area 14 and the hidden area 15 can be accessed. With both the detection signal for the initial state and the detection signal of the used state detecting circuit 27, the gate G0 is controlled. In the control IC 11 shown in FIG. 2, a sequencer (controller) (not shown) composed of a CPU is disposed.

Figure 3:
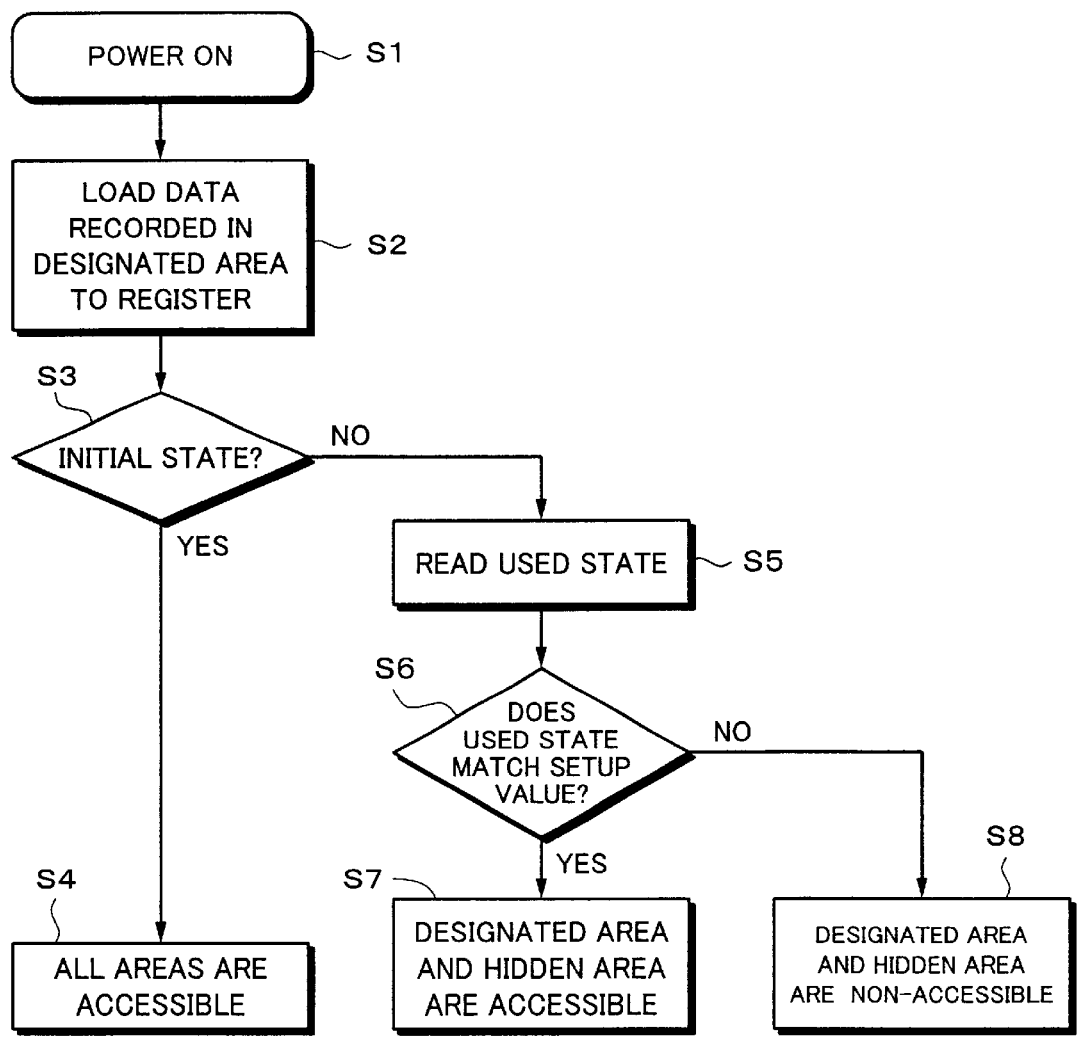
FIG. 3 is a flow chart for explaining the operation of the memory apparatus according to the embodiment shown in FIG. 2.

FIG. 3 is a flow chart for explaining the operation of the sequencer of the control IC 11 according to the embodiment of the present invention. At step S1, when the power is turned on, the reset signal generating portion 23 detects that the signal of the power line VCC goes high. As a result, the reset signal generating portion 23 generates the reset signal. With the reset signal, data recorded in the designated area 14 is loaded to the register 22 of the control IC 11 (at step S2).

At step S3, the initial state detecting portion 26 detects whether or not code loaded to the register 22 is the initial value. In the initial state, data recorded in the designated area 14 is the initial value. The initial value is a value that has been written before the memory apparatus 10 is shipped to the user. The initial value is code of which all bits are for example ones. In the initial state, with an output of the initial state detecting portion 26, the gate G0 is turned on.

When the gate G0 is turned on, all areas of the memory 12 can be accessed (at step S4). In other words, in addition to the boot areas 13a and 13b and the user area 16 that are always accessible, data can be read from the designated area 14 and the hidden area 15. In addition, data can be written to a blank area.

In the state that all areas are accessible, the user writes desired information to the hidden area 15. In addition, the user writes a desired setup value to the area 16a. Thereafter, the user records code that is different from the initial value to the area 16a. Thereafter, the user turns off the power of the memory 12. Since the memory 12 is a non-volatile memory, even if the power of the memory 12 is turned off, information written thereto is not erased. Thereafter, when the user turns on the power of the memory 12, data recorded in the designated area 14 is loaded to the register 22. In this state, since the loaded data is different from the initial value, the determined result at step S3 represents that the memory 12 is not in the initial state.

At step S5, the used state of the memory 12 is read to the used state detecting circuit 27. In addition, the setup value recorded in the area 16a is read to the used state detecting circuit 27. At step S6, the used state detecting circuit 27 detects whether or not the used capacity of the memory 12 matches the setup value. For example, the used state detecting circuit 27 detects whether or not the used capacity of the memory 12 becomes 80% of the setup value.

When the used capacity does not match the setup value, the gate G0 is turned off. Thus, the designated area 14 and the hidden area 15 are non-accessible (at step S8). When the used capacity of the memory 12 matches the setup value recorded in the record area 16a, with the detection signal of the used state detecting circuit 27, the gate G0 is turned on. As a result, the designated area 14 and the hidden area 15 can be accessed (at step S7). In other words, hidden data recorded in the hidden area 15 can be read by the access controlling portion 21.

According to the above-described embodiment of the present invention, only when the memory 12 is used in a predetermined state (with a predetermined storage capacity), the hidden area 15 can be accessed. Otherwise, hidden data recorded in the hidden area 15 cannot be accessed. The memory apparatus 10 allows hidden data to be used as win/fail mark or a point for a reward.

When the hidden data is promotion video and/or music data, the memory apparatus 10 can be used as an advertisement/commercial medium. In this case, the sponsor can circulate the memory 12 to a consumer at low cost or free of charge. Alternatively, with hidden data, the user can access a web site or apply for a reward. In this case, the number lots drawn may be increased corresponding to the acquired points. In this case, a picture, music, a number, or the like that is reproduced with hidden data may serve-f as a password for accessing a secret Internet site. With e-the-benefit acquired by such hidden data, the sales of the memory apparatus can be promoted. In addition to such business uses, the memory 12 is effective for private uses.

Figure 4:
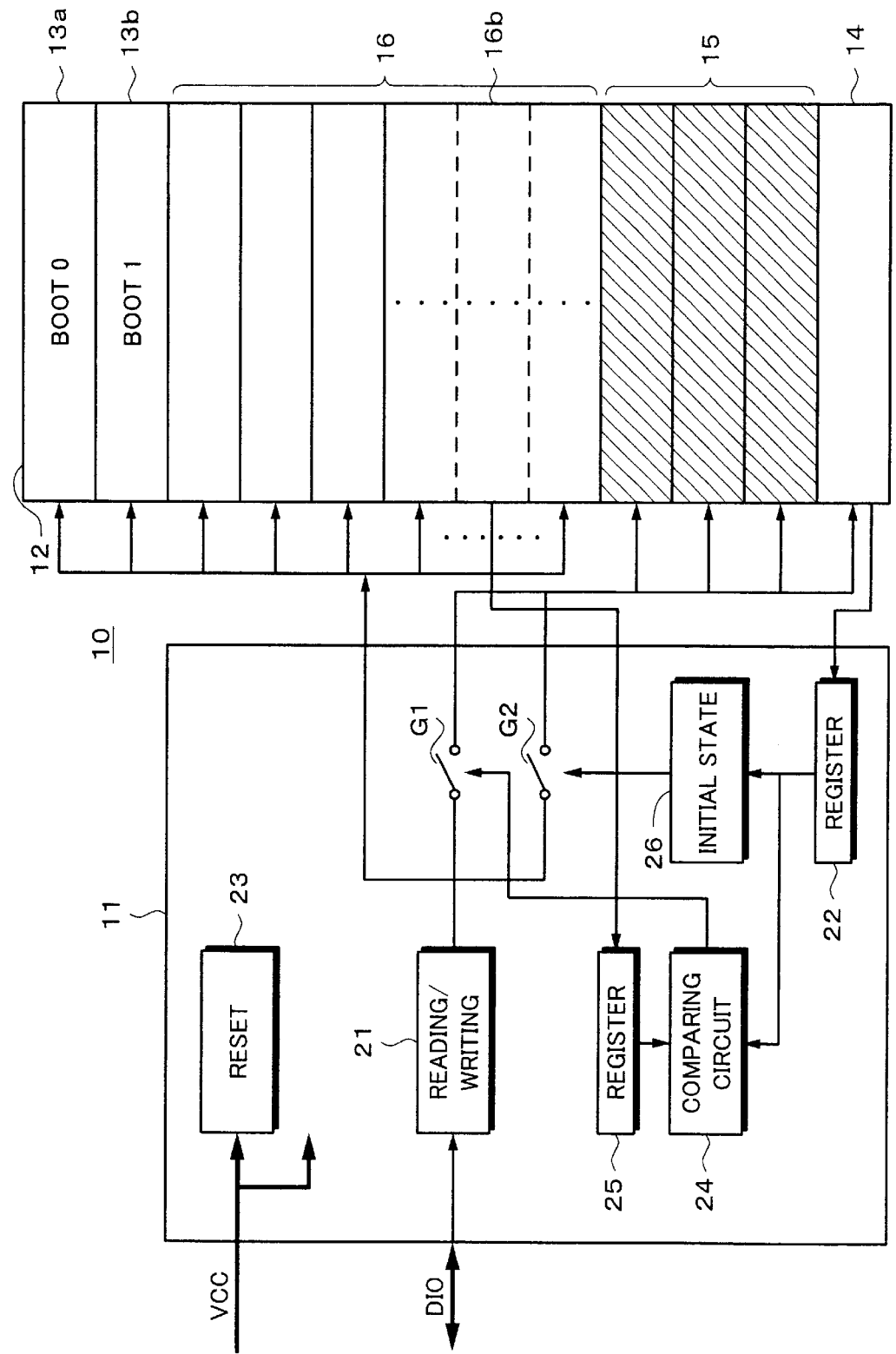
FIG. 4 is a block diagram showing the structure of a memory apparatus according to another embodiment of the present invention.

FIG. 4 shows a detail of the structure of a memory apparatus 10 according to another embodiment (second embodiment) of the present invention. For simplicity, in FIG. 4, similar portions to those of the above-described embodiment (first embodiment) shown in FIG. 2 are denoted by similar reference numerals. Boot areas 13a and 13b and a user area 16 can be always accessed by a data processing device 1. In addition to a designated area 14 in which an initial value has been written upon shipment, a second designated area 16b is formed in the user area 16. In FIG. 4, the designated area 1 represents a first designated area, whereas a designated area 2 represents a second designated area. In addition, a hidden area (hatched area) 15 is formed in a memory 12.

Gates (switches) G1 and G2 are in parallel disposed between an access controlling portion 21 and the designated area 14 and the hidden area 15 of the memory 12. Once each of the gates G1 and G2 is turned on/off with a control signal, the state is kept retained until the next control signal is supplied.

An initial state detecting portion 26 detects whether or not data that is read from the designated area 14 to a register 22 is in the initial state. With a detected output of the initial state detecting portion 26, the on/off state of the gate G2 is controlled. Data read to the register 22 is supplied to one input of a comparing circuit 24.

In addition, a register 25 is disposed in a control IC 11. The register 25 stores data that is read from the second designated area 16b. An output of the register 25 is supplied to another input of the comparing circuit 24. The comparing circuit 24 compares outputs of the registers 22 and 25 and detects whether they match. With an output of the comparing circuit 24, the on/off state of the gate G1 is controlled.

In the same manner as the gate G0 according to the above-described embodiment, the gate G2 is controlled. In other words, when the data read to the register 22 is in the initial state, the gate G2 is turned on. When the data read to the register 22 is not in the initial state, the gate G2 is turned off. In addition, the comparing circuit 24 compares the data read from the designated area 14 to the register 22 with the data read from the second designated area 16b to the register 25. When the comparing circuit 24 has detected that they match, the gate G1 is turned on. When the gate G1 is turned on, both the designated area 14 and the hidden area 15 are accessible. In contrast, when the comparing circuit 24 has detected that they do not match, the gate G1 is turned off. Thus, both the designated area 14 and the hidden area 15 are non-accessible.

FIG. 5 is a flow chart for explaining the operation of a sequencer of the control IC 11 according to the second embodiment of the present invention. At step S11, when the power of the memory apparatus 10 is turned on, a reset signal generating portion 23 detects that the signal level of a power line VCC goes high. The reset signal generating portion 23 generates a reset signal. With the reset signal, data recorded in the first designated area 14 of the memory 12 is loaded to the register 22 of the control IC 11 (at step S12).

At step S13, the initial state detecting portion 26 detects whether or not code loaded to the register 22 is the initial value. In the initial state, data recorded in the designated area 14 is the initial value. The initial value is a value that has been written to the designated area 14 before the memory apparatus 10 is delivered to the user. In the initial state, with an output of the initial state detecting portion 26, the gate G2 is turned on.

When the gate G2 is turned on, all areas of the memory 12 can be accessed (at step S14). In other words, in addition to the boot areas 13a and 13b and the user area 16 that are always accessible, data can be read from the designated area 14 and the hidden area 15. In addition, data can be written to a blank area.

In the state that all the areas are accessible, the user (for example, a secondary memory provider) writes desired information to the hidden area 15. Thereafter, the user records particular data that is different from the initial value to the first designated area 14. Thereafter, the user turns off the power of the memory apparatus 10. Since the memory 12 is a non-volatile memory, even if the power thereof is turned off, information written thereto is not erased. Thereafter, when the user turns on the power of the memory apparatus 10, data recorded in the designated area 14 is loaded to the register 22. In this case, since the loaded data (particular data) is different from the initial value, the determined result at step S13 represents that the data recorded in the register 22 is not the initial value.

At step S15, data recorded in the second designated area 16b of the memory 12 is loaded to the register 25. At step S16, the comparing circuit 24 determines whether or not data recorded in the register 22 matches data recorded in the register 25. When they match, the designated area 14 and the hidden area 15 can be accessed (at step S17). Since the boot areas 13a and 13b and the user area 16 are always accessible, all the areas becomes accessible at step S17.

When the determined result at step S16 represents the contents of the registers 22 and 25 do not match, since the gate G1 is turned off, the designated area 14 and the hidden area 15 cannot be accessed.

The memory apparatus according to the second embodiment can be used for a stamp rally. For example, with a one-day train ticket, a one-week free ticket, an excursion ticket, or the like, the user may visit a predetermined number of designated places such as stations or play spots and write predetermined data (designated values) as with stamps obtained at such places to the second designated area 16b. When the user has collected all required data at designated places (for example, when he or she has arrived at for example ten stations), data written to the second designated area 16b matches predetermined data written to the designated area 14. Thus, the gate G1 is turned on. As a result, the hidden area 15 can be accessed. As was described in the first embodiment, data that is pre-written to the hidden area 15 may be a win mark, advertisement/commercial data, a point, or premium data.

In addition, when date and time at which stamps were marked are checked for each memory apparatus, since date and time at which each user arrived at each place can be obtained, a special prize can be rewarded to a user whose has finished the rally in the shortest time corresponding to the checked result. In addition, using stamp data and date/time data, an Internet web site that only users who finished the rally can-access can be operated. In addition, a service using date/time data can be provided. Whenever each user finishes the rally, he or she may be able to apply for lottery. Alternatively, each user may apply for lottery any time in a predetermined period (drawing period).

Places at which data is written to the second designated area 16b are not limited to stations and play spots. In other words, whenever the memory apparatus is used for an audio/visual device, a digital device, or the like of the same maker, data may be written to the second designated area 16b. For example, when the memory apparatus is used for a digital camera of a particular maker, designated data is written to the designated area 16b. Next, when the memory apparatus is used for another device such as a note personal computer, designated data is written to the designated area 16b. In such a manner, when the memory apparatus is used for a predetermined number of devices (for example, five devices), data written to the designated area 16b matches the predetermined data written in the designated area 14. As a result, the hidden area 15 can be accessed.

It should be noted that the present invention is not limited to the above-described embodiments. For example, according to the above-described embodiments, when the power is turned on, the initial state is detected. Alternatively, when the memory apparatus is attached, the initial state may be detected. In addition, when the contents of the registers 22 and 25 match, the hidden area 15 can be accessed. Alternatively, when they satisfy a predetermined condition (namely, there is a difference between the contents), the hidden area 15 may be accessed. In addition, according to the present invention, as the reversibly non-writable memory, besides the nonvolatile semiconductor memory (OTP), a storage medium such as a write once type optical disc may be used. In the case of the storage medium, an area on the innermost periphery side of the disc is equivalent to the boot area.

According to the present invention, when the used memory capacity matches a predetermined setup value, a hidden area becomes accessible. In addition, when data that matches predetermined data is written to a designated area, it becomes accessible. With hidden data recorded in a hidden area, a reward can be obtained. In this case, the sales of the memory apparatus can be promoted. In addition, in combination with the memory apparatus, new business models can be established.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A memory apparatus, composed of comprising:
   a reversibly non-writable memory, including:
      a designated data area operable to store state data, the state data being an initial data value when said memory is in a predetermined state,
      a hidden data area operable to store hidden data, and
      a setup data area operable to store a memory-used value, the memory-used value being a setup state value when said memory is in the predetermined state; and
   a control circuit, including:
      an initial state detector operable to permit access to said designated data area and said hidden data area when the stored state data is the initial data value, and
      a used state detector operable, stored state data is different than the initial data value, to permit access to said designated data area and said hidden data area when the memory-used value is the setup state value, and to deny access to said designated data area and said hidden data area when the memory-used value is different than the setup state value.

2. A memory apparatus according to claim 1, wherein the reversibly non-writable memory includes a non-volatile semiconductor memory.

3. A memory apparatus according to claim 1, wherein said memory includes:
   a boot area operable to store attribute information, said boot area being always accessible.

4. A memory apparatus according to claim 1,
wherein the hidden data includes data for rewarding a user.

5. A memory apparatus according to claim 1,
wherein the hidden data includes advertisement/commercial information.

6. A memory apparatus according to claim 1, wherein the reversibly non-writable memory includes a write-once type optical disc.

7. A memory apparatus according to claim 1, further comprising a gate operable to control access to said designated data area and said hidden data area, said initial state detector and said used state detector being operable to control operation of said gate.

8. A memory apparatus according to claim 1, wherein said reversibly non-writable memory includes a user area operable to store user-provided data, said user area being always accessible.

9. A memory apparatus, composed of comprising:
a reversibly non-writable memory, including:
a first designated area operable to store state data, the state data being an initial data value when said memory is in a predetermined state,
a hidden data area operable to store hidden data, and
a second designated area operable to store further data; and
a control circuit, including:
an initial state detector operable to permit access to said first designated data area and said hidden data area when the stored state data is the initial data value, and
a comparing circuit operable, when the stored state data value is different than the initial data value, to permit access to said first designated data area and said hidden data area when the stored further data has a predetermined relation to the stored state data, and to deny access to said first designated data area and said hidden data area when the stored further data does not have a predetermined relation to the stored state data.

10. A memory apparatus according to claim 9,
wherein the reversibly non-writable memory includes a non-volatile semiconductor memory.

11. A memory apparatus according to claim 9, wherein said reversibly non-writable memory includes attribute information, said boot area being always accessible.

12. A memory apparatus according to claim 9,
wherein the hidden data written to said user data area includes data for rewarding a user.

13. A memory apparatus according to claim 9,
wherein the hidden includes advertisement/commercial information.

14. A memory apparatus according to claim 9, wherein the reversibly non-writable memory includes a write-once type optical disc.

15. A memory apparatus according to claim 9, further comprising a first gate and a second gate arranged in parallel with one another, each being operable to control access to said first designated data area and said hidden data area, said initial state detector being operable to control operation of said first gate, and said comparing circuit being operable to control operation of said second gate.

16. A memory apparatus according to claim 9, wherein said reversibly non-writable memory includes a user area operable to store user-provided data, said user area being always accessible.

17. A system, comprising:
a host device;
a memory apparatus; and
a data line coupled to said host device and to said memory apparatus;
said host device including:
a data processing device operable to generate data for storage in said memory apparatus and to read stored data from said memory apparatus;
said memory apparatus including:
a reversibly non-writable memory, and
a control circuit;
said reversibly non-writable memory including:
a designated data area operable to store state data, the state data being an initial data value when said memory is in a predetermined state,
a hidden data area operable to store hidden data, and
a setup data area operable to store a memory-used value, the memory-used value being a setup state value when said memory is in the predetermined state;
said control circuit including:
an initial state detector operable to permit access to said designated data area and said hidden data area when the stored state data is the initial data value, and
a used state detector operable, when the stored state data is different than the initial data value, to permit access to said designated data area and said hidden data area when the memory-used value is the setup state value, and to deny access to said designated data area and said hidden data area when the memory-used value is different than the set state value.

18. A system, comprising:
a host device;
a memory apparatus; and
a data line coupled to said host device and to said memory apparatus;
said host device including:
a data processing device operable to generate data for storage in said memory apparatus and to read stored data from said memory apparatus;
said memory apparatus including:
a reversibly non-writable memory, and
a control circuit;
said reversibly non-writable memory including:
a first designated data area operable to store state data, the state data being an initial data value when said memory is in a predetermined state,
a hidden data area operable to store hidden data, and
a second designated area operable to store further data;
said control circuit including:
an initial state detector operable permit access to said first designated data area and said hidden data area when the stored state data is the initial data value, and
a comparing circuit operable, when the stored state data value is different than the initial data value, to permit access to said first designated data area and said hidden data area when the stored further data has a predetermined relation to the stored state data, and to deny access to said first designated data area and said hidden data area when the stored further data does not have a predetermined relation to the stored state data.

19. A system according to claim 18, wherein the further data includes data associated with said host device.

20. A method of controlling access to a reversibly non-writable memory, said method comprising:

determining whether stored state data is an initial data value indicating that the memory is in a predetermined state;

permitting access to the stored state data and to stored hidden data when the stored state data is the initial data value; and when the stored state data is different than the initial data value, determining whether a memory-used value is a setup state value indicating that the memory is in the predetermined state, and permitting access to the stored state data and the hidden data when the memory-used value is the setup state value and denying access to the stored state data and the hidden data when the memory-used value is different than the setup state value.

21. A method of controlling access to a reversibly non-writable memory, said method comprising:

determining whether stored state data is an initial data value indicating that the memory is in a predetermined state;

permitting access to the stored state data and to stored hidden data when the stored state data is the initial data value; and when the stored state data is different than the initial data value, determining whether stored further data has a predetermined relation to the stored state data, and permitting access to the stored state data and the hidden data when the stored further data has a predetermined relation to the stored state data and denying access to the state data and the hidden data when the stored further data does not have a predetermined relation to the stored state data.

* * * * *

UNITED STATES PATENT AND TRADEMARK OFFICE
CERTIFICATE OF CORRECTION

PATENT NO. : 6,775,754 B2  Page 1 of 1
DATED : August 10, 2004
INVENTOR(S) : Takumi Okaue and Yasuko Miura It is certified that error appears in the above-identified patent and that said Letters Patent is hereby corrected as shown below:

Column 3,
Line 8, "an" should read -- and --.
Line 12, "A command" should read -- Command --.
Line 54, "of for example" should read -- of, for example, --.
Line 62, "provider for example" should read -- provider, for example, --.

Column 5,
Line 60, "serve-f" should read -- serve --.
Line 61, "With e-the-" should read -- With the --.

Column 8,
Line 39, cancel "composed of".
Line 54, after "operable," insert -- when the --.

Column 9,
Line 19, cancel "composed of".
Line 49, cancel "written to said user data area".
Line 52, after "hidden", insert -- data --.

Column 10,
Line 55, after "operable", insert -- to --.

Signed and Sealed this

Ninth Day of November, 2004

JON W. DUDAS
*Director of the United States Patent and Trademark Office*